G. R. STETSON.
Construction of Jaws for Metal Chucks.
No. 150,983.  Patented May 19, 1874.
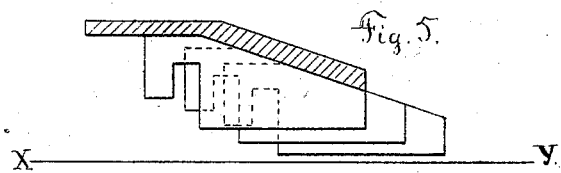
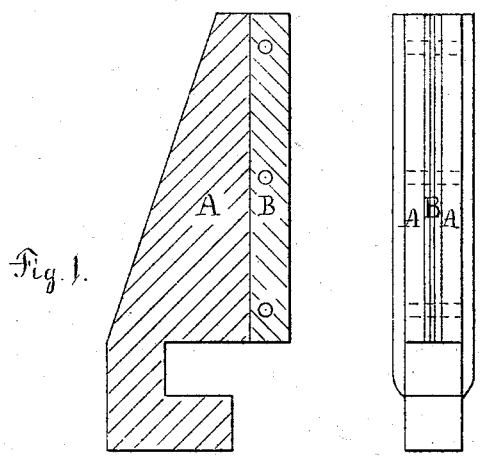
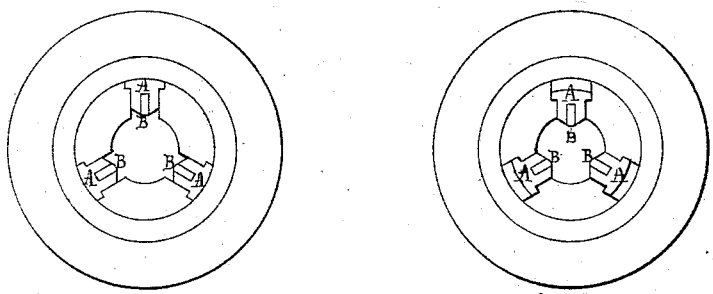

UNITED STATES PATENT OFFICE.

GEORGE R. STETSON, OF NEW BEDFORD, MASSACHUSETTS, ASSIGNOR TO MORSE TWIST-DRILL AND MACHINE COMPANY.

IMPROVEMENT IN THE CONSTRUCTION OF JAWS FOR METAL CHUCKS.

Specification forming part of Letters Patent No. 150,983, dated May 19, 1874; application filed April 29, 1874.

*To all whom it may concern:*

Be it known that I, GEORGE R. STETSON, of New Bedford, Massachusetts, have invented an Improved Jaw for Self-Centering Chucks, of which the following is a specification:

Chuck-jaws have heretofore been made from a single piece of soft steel, which must, of course, be hardened to make the chuck fit for use; but in hardening the jaw it is always warped or sprung more or less, so that it requires to be refitted to the chuck, and very frequently it is impossible to refit it accurately enough to bring the holding-edge of the jaw in that nice relation to the axis of the chuck, and to the holding-edges of the other jaws, which is highly desirable in all chucks, and essential when the chuck is to be used in work where great accuracy is required.

The main object of this invention is to remedy this difficulty; and the invention consists in a chuck-jaw made of soft steel or other suitable metal, which can be readily fitted to the chuck with the utmost accuracy, and provided with a small hardened-steel plate, one edge of which is the holding-edge of the jaw.

In the drawings, A is the main body of the jaw, and B the hardened-steel plate. As the main body of the jaw is not hardened, there can be no warping or springing of the jaw from hardening it, while there is no practical difficulty in fitting the hardened-steel plate B to the jaw, so that the holding-edge of the jaw shall be practically perfect in its relation to the axis of the chuck and to the acting edges of the other jaws.

The best mode of combining the jaw and the hardened plate is by means of a groove in the jaw, and pins passing through the walls of this groove and through the plate, as shown in the drawings.

Figures 1 and 2 are enlarged views of a jaw embodying the invention. Figs. 2 and 3 represent the jaws in place in the chuck, and, with the diagram, Fig. 5, are intended to illustrate the relation of the holding-edges of these jaws to each other and to the axis of the chuck, the line $x\ y$ in Fig. 5 representing the axis.

The very great advantage of having this relation exactly right is well known, and the improved jaws above described are greatly superior in this respect to any heretofore known; moreover, the plate B can readily be replaced when its holding-edge becomes worn, and at very little expense.

What is claimed as the invention is—

The improved chuck-jaw above described, consisting of the two parts A and B, constructed and arranged together as described.

GEORGE R. STETSON.

Witnesses:
 GIDEON ALLEN, Jr.,
 D. W. CORY.